United States Patent [19]

Bleier

[11] Patent Number: 5,361,171
[45] Date of Patent: Nov. 1, 1994

[54] LATERAL TRANSFER RETROREFLECTOR ASSEMBLY

[75] Inventor: Zvi Bleier, Comack, N.Y.

[73] Assignee: PLX Inc., Deer Park, N.Y.

[21] Appl. No.: 26,472

[22] Filed: Mar. 4, 1993

[51] Int. Cl.$^5$ .......................... G02B 5/08; G02B 5/12; G02B 7/18

[52] U.S. Cl. .................................... 359/855; 359/861; 359/618; 359/529

[58] Field of Search ............... 359/359, 618, 834, 836, 359/850, 855, 856, 857, 861, 871

[56] References Cited

U.S. PATENT DOCUMENTS

| | | | |
|---|---|---|---|
| 2,378,396 | 6/1945 | Fassin | 359/856 |
| 3,663,084 | 5/1972 | Lipkins | |
| 3,936,194 | 2/1976 | Lipkins | |
| 3,977,765 | 8/1976 | Lipkins | |
| 4,065,204 | 12/1977 | Lipkins | |
| 4,319,804 | 3/1982 | Lipkins | |
| 4,367,922 | 1/1983 | Lipkins | 359/857 |
| 5,024,514 | 6/1991 | Bleier et al. | |
| 5,301,067 | 4/1994 | Bleier et al. | 359/857 |

Primary Examiner—Ricky D. Shafer
Attorney, Agent, or Firm—Gottlieb, Rackman & Reisman

[57] ABSTRACT

An improved lateral transfer retroreflector assembly is provided, comprising a tubular member having a channel, a mirror member and a roof mirror mounted to a mounting member. The tubular member has first and second ends, the first end having mounted thereat the mirror member, and the second end forming a channel within which the roof mirror is mounted. The roof mirror is adhered to a mounting member along a junction formed in the roof mirror. The shape of the mounting member substantially conforms to the shape of the junction in the roof mirror thereby ensuring a secure, accurate mount. The channel has an upper and lower opening through which the roof mirror extends. The openings created and the manner in which the roof mirror is mounted within the channel ensure that the depth of the tubular member will be minimized.

27 Claims, 2 Drawing Sheets

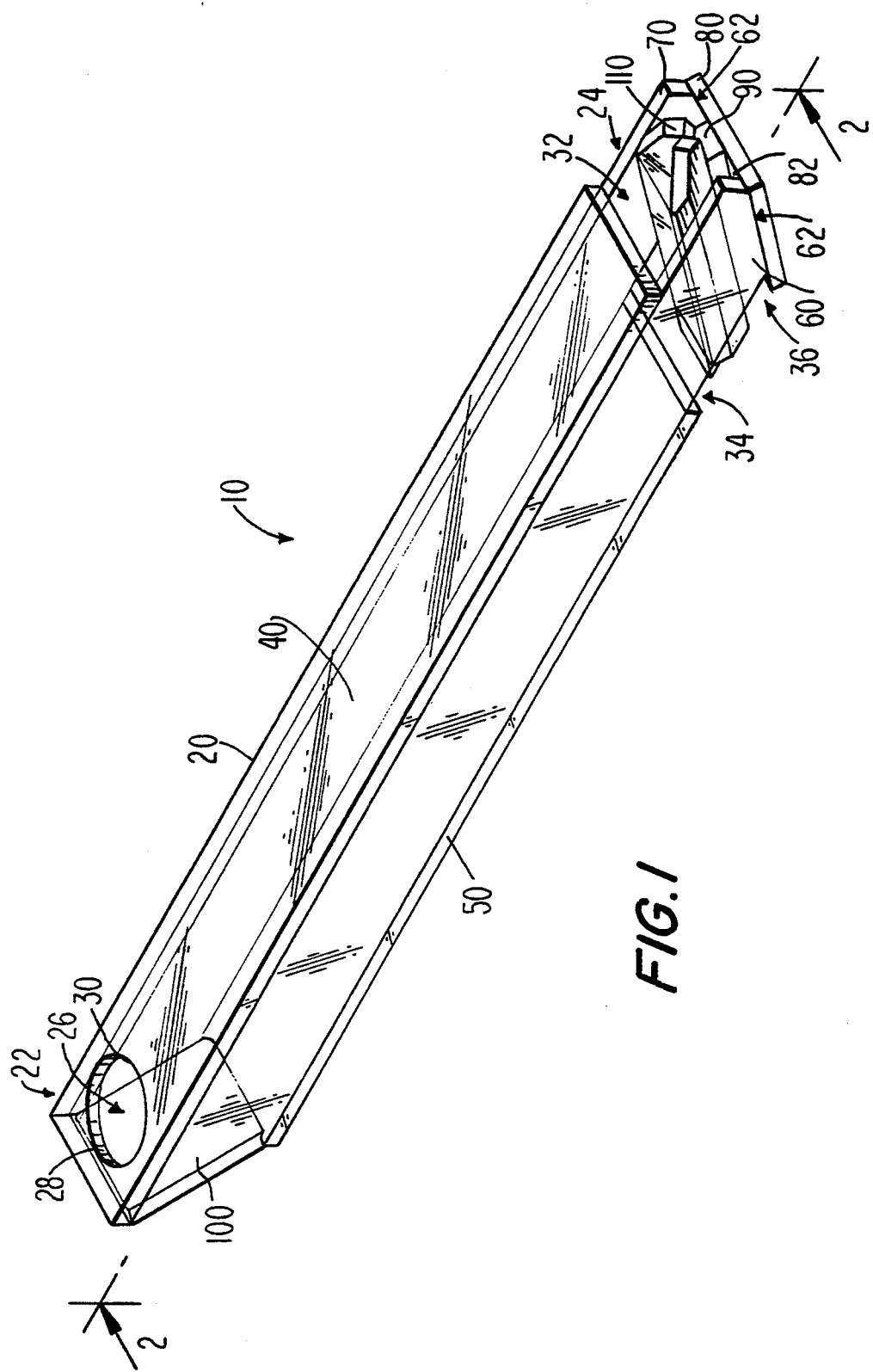

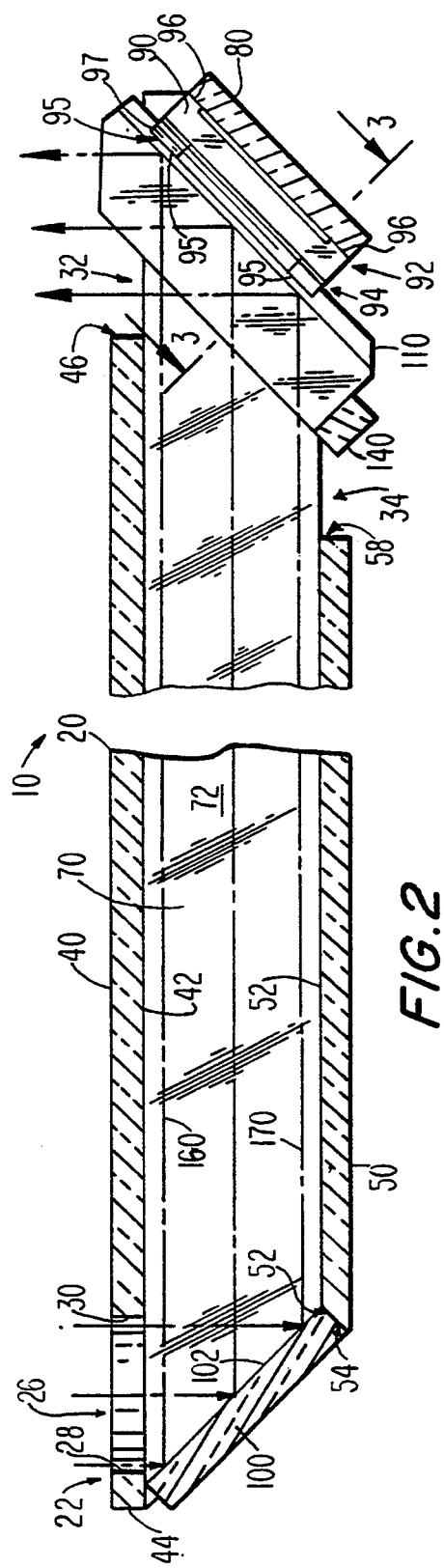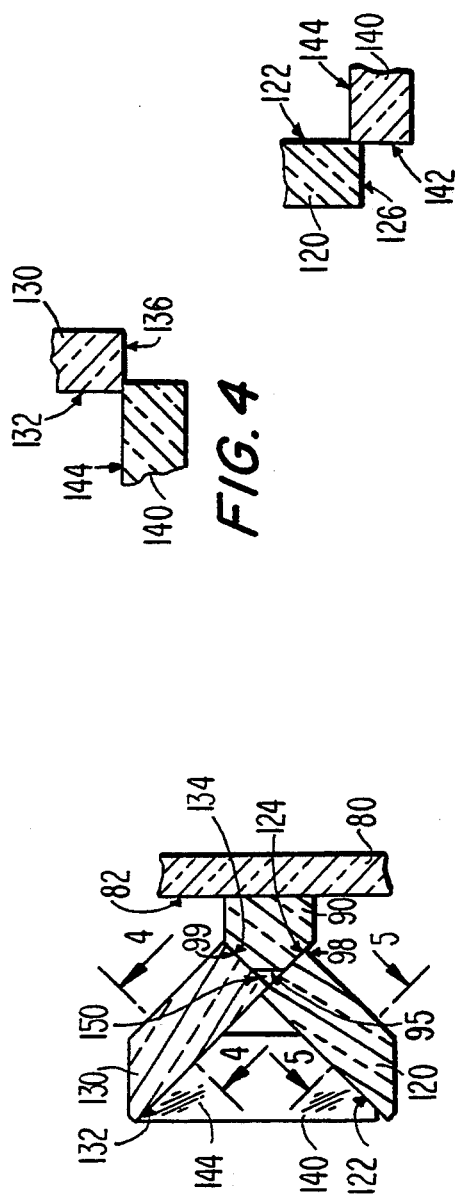

LATERAL TRANSFER RETROREFLECTOR ASSEMBLY

BACKGROUND OF THE INVENTION

This invention relates to the field of retroreflectors, and more particularly, to lateral transfer retroreflectors.

Retroreflectors generally have the property of causing incident and reflected light rays to travel along parallel paths. To achieve this parallelism, a retroreflector normally consists of three optically flat reflecting surfaces, each reflecting surface positioned at a right angle to each of the other reflecting surfaces. Any departure of the reflecting surfaces from their perpendicular orientation will cause the incident and reflected light rays to depart from parallel.

Retroreflectors lose accuracy when they are exposed to external stresses. Examples of such external stresses are mass, thermal expansion or contraction of the substrate material from which the retroreflector is made, or deflection caused by curing of the adhesives which join members of the retroreflector.

Retroreflectors, and lateral transfer retroreflectors, which translate the reflected beam some calculated distance from the incident light beam, are old in the art. Examples of prior art retroreflectors and lateral transfer retroreflectors are:

U.S. Pat. No. 3,977,765, to Morton S. Lipkins, which discloses a retroreflector mounted to a support structure through means of applying an adhesive into the joints formed between joined members of the retroreflector and to a flat surface of the support structure.

U.S. Pat. No. 4,065,204, also to Morton S. Lipkins, which discloses a lateral transfer retroreflector consisting of a base, a roof reflector having two reflecting plates and a third reflector. The base acts as an extension of the third reflector by attaching the third reflector to the roof reflector in the manner known to retroreflectors to produce the lateral transfer retroreflector construction.

U.S. Pat. No. 5,024,514, to Zvi Bleier and Morton S. Lipkins, which discloses a lateral transfer retroreflector having a tubular member, a roof mirror and a mirror panel. Both the roof mirror and mirror panel are attached to the tubular member by use of three co-planar mounting pads.

It would be desirable to provide a high-accuracy lateral transfer retroreflector which, due to the construction of the tubular member and the manner of mounting the roof mirror to the tubular member, achieves reduced structural dimensions, less distortion due to mass and a more secure roof mirror mount.

SUMMARY OF THE INVENTION

In accordance with the invention, an improved lateral transfer retroreflector assembly is provided. The lateral transfer retroreflector assembly of the invention is comprised of a tubular member having a channel, a mirror member and a roof mirror mounted to a mounting member.

The tubular member is constructed of a material having dimensions which are relatively stable with respect to temperature, such as fused quartz or annealed pyrex. The tubular member has first and second ends, the first end having mounted thereat the mirror member, and the second end forming a channel within which the roof mirror is mounted.

The first end of the tubular member has two perpendicular slanting surfaces onto which the mirror panel is attached. The mirror panel is preferably rectangular and has three mounting pads for engaging the slanting surfaces of the tubular member. The first end of the tubular member also has an aperture extending therethrough to allow for light transmission into and out of the tubular member to and from the mirror panel. The size of the aperture closely corresponds to the depth of the tubular member.

The tubular member comprises top and bottom sides having first and second edge surfaces; the first edge surfaces at the first end of the tubular member and the second edge surfaces proximate to the second end of the tubular member. The tubular member also has first and second length defining sides which extend beyond the second edge surfaces of the top and bottom sides forming a channel at the second end of the tubular member. The channel is closed off by the attachment of an end member to co-planar edge surfaces of the length defining sides. The end member has a substantially flat receiving surface which ensures its accurate mounting to the co-planar edge surfaces of the length defining sides.

A mounting member having at least one mounting pad is attached to the receiving surface of the end member within the channel. The roof mirror is attached to a second side of the mounting member along the junction formed when the first and second members of the roof mirror are joined. The shape of the second side of the mounting member substantially conforms to the shape of the junction in the roof mirror thereby ensuring a secure, accurate mount.

The channel has an upper and lower opening through which the roof mirror extends, when the roof mirror is mounted to the tubular member. The openings created by the channel and the manner in which the roof mirror is mounted within the channel ensure that the depth of the tubular member will be minimized. Since the roof mirror is mounted so as not to interfere with the propagation of a light beam through the tubular member, and since the roof mirror extends through the channel, the entire reflective surfaces of the roof mirror can be used, which allows the depth of the lateral transfer retroreflector of the present invention to closely correspond to the size of the aperture.

Accordingly, it is an object of the present invention to provide an improved lateral transfer retroreflector assembly.

Still another object of the invention is to provide a lateral transfer retroreflector assembly having a tubular member having reduced dimensions.

Yet a further object of the invention is to provide a lateral transfer retroreflector assembly having a roof mirror mounted at one end such that the manner of mounting the roof mirror does not interfere with the propagation of light beams through the tubular member.

Still a further object of the invention is to provide a lateral transfer retroreflector assembly wherein the manner of mounting the roof mirror is secure, as well as accurate.

Other objects of the invention will in part be obvious and will in part be apparent from the following description.

The invention accordingly comprises an assembly possessing the features, properties and relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 1 is a perspective view of a lateral transfer retroreflector assembly made in accordance with the invention;

FIG. 2 is a cross-sectional view taken along line 2—2 of FIG. 1;

FIG. 3 is a cross-sectional view taken along line 3—3 of FIG. 2;

FIG. 4 is a cross-sectional view taken along line 4—4 of FIG. 3; and

FIG. 5 is a cross-sectional view taken along line 5—5 of FIG. 3.

DETAILED DESCRIPTION OF THE PREFERRED EMBODIMENT

Referring to FIG. 1, a lateral transfer retroreflector assembly made in accordance with the invention and generally designated as 10, is illustrated. Lateral transfer retroreflector 10 includes a tubular member 20, a mirror panel 100 and a roof mirror 110. Tubular member 20, as best shown in FIGS. 1 and 2, is preferably made from fused quartz or fine annealed pyrex. Tubular member 20 is generally of a rectangular or square cross-section.

Tubular member 20 is comprised of a top side 40, a bottom side 50 and first and second length defining sides 60 and 70, respectively. Generally, the depth of tubular member 20 is measured as the distance between an inside surface 42 of top side 40 and an inside surface 52 of bottom side 50. Both the length and depth measurements of tubular member 20, and therefore lateral transfer retroreflector 10, are extremely important with respect to where and how lateral transfer retroreflector 10 is used.

Specifically, lateral transfer retroreflector 10 of the present invention is a highly accurate instrument which can be used in such precise fields as surveying, the military and aerospace applications, to name a few. It is usually necessary that instruments used in these areas meet very specific stress and dimensional specifications and therefore the manner of construction of lateral transfer retroreflector 10 with respect to joining parts thereof, and the length and depth dimensions of lateral transfer retroreflector 10 are important.

As will be seen in the following discussion, although lateral transfer retroreflectors are old in the art, the manner in which roof mirror 110 is made and mounted to tubular member 20 will greatly impact the durability and dimensional aspects of lateral transfer retroreflector 10.

Continuing now with FIGS. 1 and 2, tubular member 20 has a first end 22. At first end 22 mirror member 100 is mounted to tubular member 20 and an aperture 26 through top side 40 is located above mirror member 100.

The construction and mounting of mirror member 100 is old in the art, as disclosed in U.S. Pat. No. 5,024,514 to Zvi Bleier and Morton S. Lipkins, which is hereinafter incorporated by reference. Briefly describing this assembly, mirror member 100 has two co-planar mounting pads (not shown) and a third mounting pad (not shown) substantially perpendicular to the co-planar mounting pads. The co-planar mounting pads can be adhered to inside surface 72 of second length defining side 70 of tubular member 20, while the third mounting pad is adhered to a slanting surface 54 of first edge surface 52 of bottom side 50 (FIG. 2). This method of mounting mirror member 100 to tubular member 20 ensures that deflection of reflective surface 102 of mirror member 100 is not distorted due to stresses caused by curing of the adhesive.

Continuing with FIGS. 1 and 2, aperture 26 through top side 40 of tubular member 20 can be of any geometric configuration, the preferred configurations being in the circle and square families. Aperture 26 has a first end 28 closer to first edge surface 44 of top side 40 and a second end 30 located away from first end 28 in a direction from first end 22 to second end 24 of tubular member 20. As will be discussed in greater detail below, the depth of tubular member 20 will dictate the sizes of mirror member 100, aperture 26 and roof mirror 110.

Specifically, as seen in FIG. 2, the distance between first and second ends 28 and 30 of aperture 26 will usually be equal to or slightly less than the depth of tubular member 20. Such dimensional congruity will ensure that a light beam 160 entering (or exiting) lateral transfer retroreflector 10 through aperture 26 near first end 28 will propagate through tubular member 20 very close to inside surface 42 of top side 40; or that a beam 170 entering (or exiting) lateral transfer retroreflector 10 through aperture 26 near second end 30 will propagate through tubular member 20 very close to inside surface 52 of bottom side 50. It is therefore seen that the size of aperture 26 is directly related to the depth of tubular member 20. As will be discussed below, the close proximity of propagating beams 160 and 170 to inside surfaces 42 and 52 of tubular member 20 is due to the construction of roof mirror 110, second end 24 of tubular member 20 and how roof mirror 110 is mounted to tubular member 20.

Turning now to a discussion of roof mirror 110, as best seen in FIGS. 1 and 3, roof mirror 110 has a first member 120, having a first edge surface 126, a second member 130 having a second edge surface 136 and a third member 140. First member 120 has a reflective surface 122 and second member 130 has a reflective surface 132.

Roof mirror 110 is assembled by adhering a portion of first width defining surface 124 of first member 120 to a portion of reflective surface 132 of second member 130 (best seen in FIG. 3). Third member 140 is attached between first and second members 120 and 130 by adhering a portion of abutting surface 142 of third member 140 to a portion of first reflective surface 122 of first member 120 (FIG. 5) and adhering a portion of second edge surface 136 of second member 130 to a portion of flat surface 144 of third member 140 (FIG. 3). This construction of roof mirror 110 duplicates the secure construction of a hollow retroreflector.

As seen in FIG. 1, second end 24 of tubular member 20 has a channel 36 formed therethrough. Channel 36 is formed because first and second length defining sides 60 and 70 extend beyond second edge surfaces 46 and 58 of top side 40 and bottom side 50, respectively. First and second length defining sides 60 and 70 have attached thereto end member 80, which closes off channel 36 in the longitudinal direction of lateral transfer retroreflector 10. First and second length defining sides 60 and 70 have co-planar edge surfaces 62 onto which is adhered a receiving surface 82 of end member 80.

Continuing with FIGS. 1, 2 and 3, tubular member 20 has a mounting member 90 located within channel 36 upon which roof mirror 110 is mounted. Mounting member 90 has a first side 92 and a second side 94. First side 92 has at least one mounting pad (not shown), but preferably has two mounting pads 96, as seen in FIG. 2, for adhering mounting member 90 to receiving surface 82 of end member 80.

Mounting member 90 has a second side 94 which receives roof mirror 110. As seen in FIG. 2, second side 94 of mounting member 90 is made up of two mounting keys 97. Mounting keys 97 have shapes designed to matingly engage a portion of roof mirror 110, for the secure mounting of roof mirror 110 to tubular member 20, discussed immediately below.

As seen in FIG. 3, first and second width defining surfaces 124 and 134 of first and second members 120 and 130, form a V-notch junction when roof mirror 110 is assembled as previously discussed. The shape of mounting keys 97 of mounting member 90 is designed to matingly engage the V-notch junction of roof mirror 110. Specifically, mounting keys 97 have first mounting surfaces 98 and second mounting surfaces 99. Each of first mounting surfaces 98 is adhered to first width defining surface 124 of first member 120, while each of second mounting surfaces 99 is adhered to second width defining surface 134 of second member 130.

In order to further secure the mounting of roof mirror 110 to mounting member 90, first and second mounting surfaces 98 and 99 do not meet at a point, as seen in FIG. 3. Instead, mounting keys 97 have flat tops 95 which create a cavity 150 (FIG. 3). Cavity 150 contains the same adhesive (not shown) that is used to adhere first and second width defining surfaces 124 and 134 to first and second mounting surfaces 98 and 99, respectively.

The reason for mounting member 90 having mounting pads 96 and mounting keys 97, instead of simply having one uniformly-dimensioned piece, is to ensure that minimum stresses are created through roof mirror 110 to protect against deflections caused during the curing of the adhesive materials. Accordingly, isolated mounting areas are preferred in order to limit the areas of adhesive.

Focusing again on FIGS. 1 and 2, it is seen that when roof mirror 1100 is mounted to mounting member 90, reflective surfaces 122 and 132 of roof mirror 110 are unobstructed by any mounting mechanism and that roof mirror 110 extends through upper and lower openings 32 and 34 of channel 36. Both of these factors contribute to the relative equivalence of the depth of tubular member 20 to the size of aperture 26, because it allows light beams 160 and 170 to travel close to inside surfaces 42 and 52, respectively (FIG. 2). Accordingly, the construction of second end 24 of tubular member 20 and the manner in which roof mirror 20 is mounted, allow the depth dimension of tubular member 20, and therefore of lateral transfer retroreflector assembly 10, to be minimized.

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A lateral transfer retroreflector assembly comprising:

a tubular member having a top side, a bottom side and first and second length defining sides, each of said top and bottom sides having first edge surfaces at a first end of said tubular member and second edge surfaces proximate a second end of said tubular member opposite said first end;

a mirror member mounted to said tubular member at said first end; and a roof mirror mounted to said tubular member at said second end;

wherein each of said first and second length defining sides of said tubular member extends from said first end of said tubular member beyond said second edge surfaces of said top and bottom sides to form a channel through said second end of said tubular member to receive said roof mirror.

2. A lateral transfer retroreflector assembly as recited in claim 1, wherein said tubular member further comprises an end member attached to said first and second length defining sides at said second end of said tubular member.

3. A lateral transfer retroreflector assembly as recited in claim 2, wherein said end member attaches to said first and second length defining sides along a substantially flat receiving surface of said end member.

4. A lateral transfer retroreflector assembly as recited in claim 2, wherein said tubular member further comprises a mounting member attached to said end member.

5. A lateral transfer retroreflector assembly as recited in claim 4, wherein said mounting member has at least one planar mounting pad on a first side thereof for mounting to said end member.

6. A lateral transfer retroreflector assembly as recited in claim 5, wherein said roof mirror is mounted to a second side of said mounting member opposite said first side.

7. A lateral transfer retroreflector assembly as recited in claim 6, wherein said roof mirror comprises:

a first member having a first reflective planar surface, a first width defining surface substantially perpendicular to said first reflective surface and a first edge surface substantially mutually perpendicular to said first width defining surface and said first reflective surface;

a second member having a second reflective planar surface, a second width defining surface substantially perpendicular to said second reflective surface and a second edge surface substantially mutually perpendicular to said second width defining surface and said second reflective surface;

said first member mounted to said second member, so that said first and second reflective surfaces are substantially perpendicular, by adhering a portion of said first width defining surface of said first member to a portion of said second reflective surface of said second member; and a third member mounted between said first reflective surface of said first member and said second edge surface of said second member.

8. A lateral transfer retroreflector assembly as recited in claim 7, wherein at least a portion of said first and second width defining surfaces of said first and second members of said roof mirror are attached to said second side of said mounting member.

9. A lateral transfer retroreflector assembly as recited in claim 7, wherein said first width defining surface of said first member is attached to said second reflective surface of said second member and a junction is formed between said first and second width defining surfaces.

10. A lateral transfer retroreflector assembly as recited in claim 9, wherein said second side of said mounting member comprises at least one mounting key having first and second mounting surfaces for receiving said roof mirror.

11. A lateral transfer retroreflector assembly as recited in claim 10, wherein said first and second mounting surfaces of said at least one mounting key matingly engage at least a portion of said junction of said roof mirror.

12. A lateral transfer retroreflector assembly as recited in claim 11, wherein said roof mirror is adhered within said channel of said tubular member to said at least one mounting key of said mounting member at said junction, said roof mirror extends through upper and lower openings made by said channel in said tubular member, and a depth of said tubular member, measured between a bottom wall surface of said top side and a top wall surface of said bottom side, is minimized.

13. A lateral transfer retroreflector assembly comprising:
a tubular member having first and second ends;
a mirror member mounted to said tubular member at said first end; and
a roof mirror comprising:
a first member having a first reflective planar surface, a first width defining surface substantially perpendicular to said first reflective surface and a first edge surface substantially mutually perpendicular to said first width defining surface and said first reflective surface;
a second member having a second reflective planar surface, a second width defining surface substantially perpendicular to said second reflective surface and a second edge surface substantially mutually perpendicular to said second width defining surface and said second reflective surface;
said first member mounted to said second member, so that said first and second reflective surfaces are substantially perpendicular, by adhering a portion of said first width defining surface of said first member to a portion of said second reflective surface of said second member; and
a third member mounted between said first reflective surface of said first member and said second edge surface of said second member;
wherein said first and second width defining surfaces of said first and second members of said roof mirror are substantially perpendicular forming a junction to mount said roof mirror at said second end of said tubular member.

14. A lateral transfer retroreflector assembly as recited in claim 13, wherein said tubular member further comprises a top side, a bottom side and first and second length defining sides, each of said top and bottom sides having first edge surfaces at a first end of said tubular member and second edge surfaces proximate a second end of said tubular member opposite said first end.

15. A lateral transfer retroreflector assembly as recited in claim 14, wherein said first and second length defining sides extend from said first end of said tubular member beyond said second edge surfaces of said top and bottom sides to form a channel through said second end of said tubular member for receiving said roof mirror.

16. A lateral transfer retroreflector assembly as recited in claim 15, wherein said tubular member further comprises an end member attached to said first and second length defining sides at said second end of said tubular member.

17. A lateral transfer retroreflector assembly as recited in claim 16, wherein said end member attaches to said first and second length defining sides along a substantially flat receiving surface of said end member.

18. A lateral transfer retroreflector assembly as recited in claim 16, wherein said tubular member further comprises a mounting member attached to said end member.

19. A lateral transfer retroreflector assembly as recited in claim 18, wherein said mounting member has at least one planar mounting pad on a first side thereof for mounting to said end member.

20. A lateral transfer retroreflector assembly as recited in claim 19, wherein said roof mirror is mounted to a second side of said mounting member opposite said first side.

21. A lateral transfer retroreflector assembly as recited in claim 20, wherein said second side of said mounting member comprises at least one mounting key having first and second mounting surfaces for receiving said roof mirror.

22. A lateral transfer retroreflector assembly as recited in claim 21, wherein said first and second mounting surfaces of said at least one mounting key matingly engage at least a portion of said junction of said roof mirror.

23. A lateral transfer retroreflector assembly as recited in claim 22, wherein said roof mirror is adhered within said channel of said tubular member to said at least one mounting key of said mounting member by said junction, said roof mirror extends through upper and lower openings made by said channel in said tubular member, and a depth of said tubular member, measured between a bottom wall surface of said top side and a top wall surface of said bottom side, is minimized.

24. A method of assembling a lateral transfer retroreflector assembly, comprising the steps of:
forming a tubular member having a top side, a boom side and first and second length defining sides, each of said top and bottom sides having first edge surfaces at a first end of said tubular member and second edge surfaces proximate a second end of said tubular member opposite said first end, wherein each of the said first and second length defining sides of said tubular member extends from said first end of said tubular member beyond said second edge surfaces of said top and bottom sides to form a channel through said second end of said tubular member;
forming a mirror member having a reflective surface;
mounting said mirror member to said first end of said tubular member;

forming a roof mirror comprising first and second members, said first and second members having substantially perpendicular reflective surfaces; and mounting said roof mirror within said channel of said tubular member.

25. A method of assembling a lateral transfer retroreflector assembly as recited in claim 24, further comprising the step of attaching an end member at said second end of said tubular member, said end member closing said channel.

26. A method of assembling a lateral transfer retroreflector assembly as recited in claim 25, further comprising the step of attaching a mounting member having at least one planar mounting pad on a first side thereof to said end member for receiving said roof mirror.

27. A method of assembling a lateral transfer retroreflector assembly as recited in claim 26, further comprising the step of adhering said roof mirror to a second side of said mounting member, said roof mirror having a junction formed between said first and second members which matingly engages said second side of said mounting member.

* * * * *